United States Patent Office 2,874,157
Patented Feb. 17, 1959

2,874,157

ACYLATED DIAMINOPYRIMIDINES

John J. Traverso and Calvert W. Whitehead, Indianapolis, Ind., assignors to Eli Lilly and Company, Indianapolis, Ind., a corporation of Indiana No Drawing. Application September 11, 1957
Serial No. 683,205

3 Claims. (Cl. 260—256.4)

This invention relates to certain novel acylated diaminopyrimidines. The compounds provided by this invention can be represented by the formula

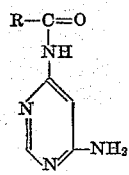

wherein R is a methyl or an ethyl radical.

The compounds of this invention are diuretic agents, which have certain advantages over those diuretic agents containing mercury, since they possess a more favorable therapeutic index and a wider individual tolerance. They can be administered in the usual oral dosage forms, such as compressed tablets, filled capsules, and the like.

The compounds corresponding to the above formula are prepared by acylating 4,6-diaminopyrimidine with an acyl halide or an acyl anhydride, in an inert solvent. The compounds thus prepared are high-melting, white, crystalline solids.

This invention is further illustrated by the following specific examples.

EXAMPLE 1

*Preparation of 4-amino-6-acetamidopyrimidine*

0.1 mol of 4,6-diaminopyrimidine was dissolved in about 150 ml. of dioxan. To the solution was added 0.1 mol of acetic anhydride, and the reaction mixture was heated at refluxing temperature for about four and one-half hours. The reaction mixture was then cooled to about 25° C., whereupon 4-amino-6-acetamidopyrimidine precipitated in crystalline form. The precipitate was separated by filtration, and the filter cake was dissolved in 1 N hydrochloric acid. The acid solution was decolorized, and was neutralized with 1 N sodium hydroxide thus again precipitating 4-amino-6-acetamidopyrimidine. This procedure was repeated, yielding purified crystalline 4-amino-6-acetamidopyrimidine which melted with decomposition at about 325° C.

*Analysis.*—Calculated: C, 47.36; H, 5.30; N, 36.82.
Found: C, 47.45; H, 5.33; N, 37.03.

EXAMPLE 2

*Preparation of 4-amino-6-propionamidopyrimidine*

0.1 mol of 4,6-diaminopyrimidine was dissolved in about 150 ml. of dioxan. To the solution was added about 0.1 mol of propionyl chloride, and the mixture was heated at refluxing temperature for about five hours. The dioxan was removed by evaporation in vacuo, and the residue comprising 4-amino-6-propionamidopyrimidine hydrochloride formed in the above reaction, was dissolved in 50 ml. of a 50 percent aqueous-ethanol solution. The solution of the hydrochloride salt was decomposed by the addition of a slight excess of 1 N sodium hydroxide. The alkaline solution was decolorized by treating it was activated charcoal, and the ethanol was removed from the solution by evaporation in vacuo. The aqueous solution was cooled to about 0° C. for about sixteen hours whereupon 4-amino-6-propionamidopyrimidine separated in crystalline form. The crystals were collected by filtration, and were recrystallized from 50 percent aqueous-ethanol. 4-amino-6-propionamidopyrimidine thus prepared melted at about 231° C.

*Analysis.*—Calculated: C, 46.40; H, 6.12; N, 38.65.
Found: C, 46.39; H, 6.17; N, 38.53.

We claim:

1. A compound represented by the formula

wherein R is chosen from the group consisting of methyl and ethyl.
2. 4-amino-6-acetamidopyrimidine.
3. 4-amino-6-propionamidopyrimidine.

References Cited in the file of this patent

Chemical Abstracts, vol. 47, page 2181 (1953).